Jan. 14, 1958     R. B. GROVER     2,819,639
APPARATUS FOR PRECISION CONTOURING
Filed Sept. 17, 1952     3 Sheets-Sheet 1

INVENTOR.
Raymond B. Grover
BY Mason, Kolehmainen,
Rathburn & Wyss
Attorneys

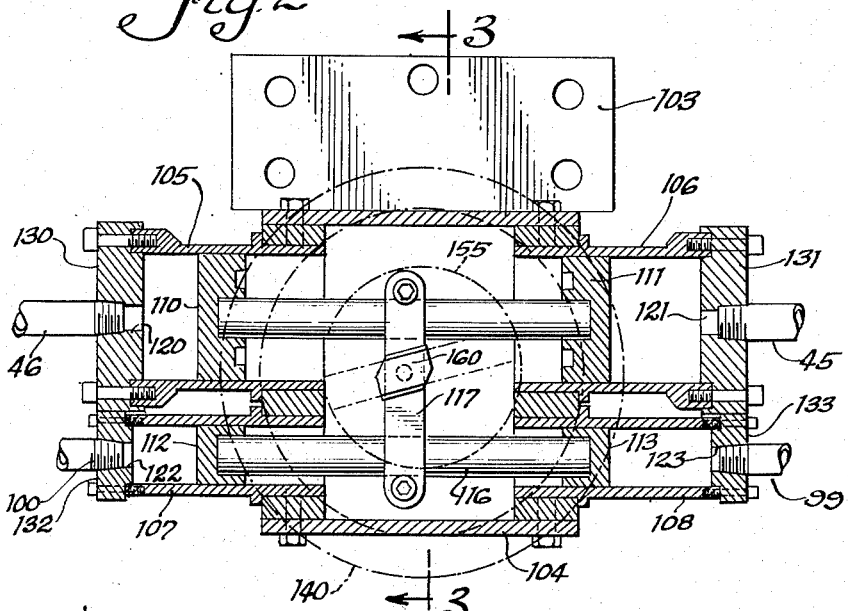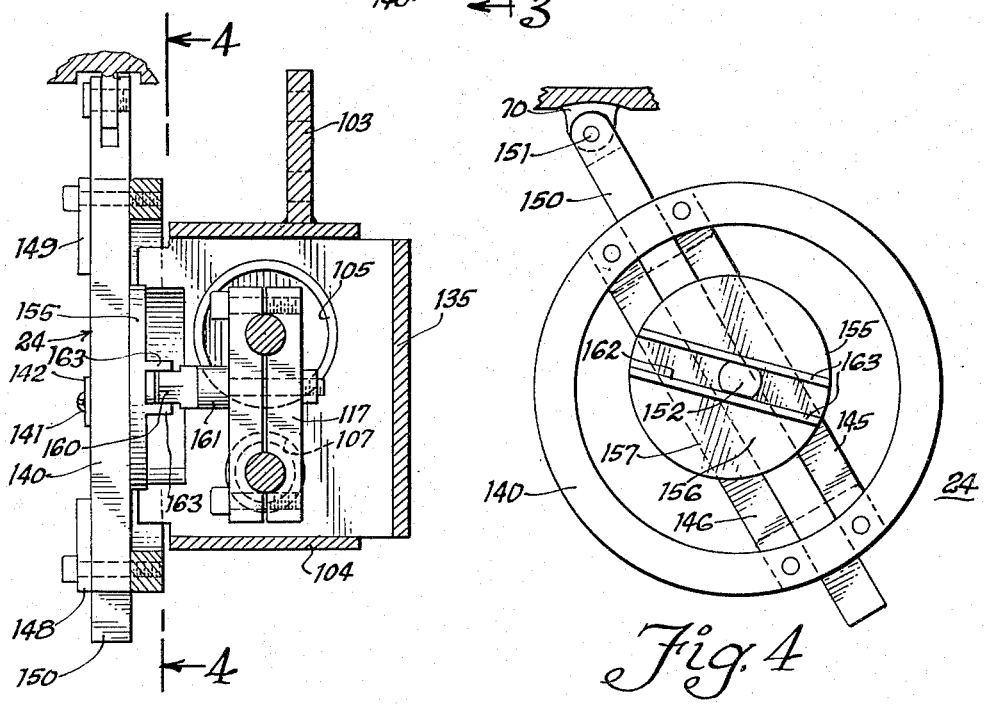

Jan. 14, 1958     R. B. GROVER     2,819,639
APPARATUS FOR PRECISION CONTOURING

Filed Sept. 17, 1952     3 Sheets-Sheet 3

INVENTOR.
Raymond B. Grover
BY Mason, Kolehmainen,
Rathburn & Wyss
Attorneys

United States Patent Office 2,819,639
Patented Jan. 14, 1958

2,819,639

APPARATUS FOR PRECISION CONTOURING

Raymond B. Grover, Fairbury, Ill.

Application September 17, 1952, Serial No. 310,053

9 Claims. (Cl. 82—14)

This invention relates to apparatus for precision contouring and more particularly hydraulically controlled precision contouring apparatus wherein accurate size and shoulder control is automatically attained.

Hydraulic means for controlling the position or path of a tool or other element in the performance of machining operations have been suggested heretofore. Such prior art arrangements have not been entirely satisfactory in that they left much to be desired from the standpoint of an automatic tool which could follow a master and perform all the necessary cutting operations including facing, tapering and the like, so as to reproduce exactly the master. Fairly accurate reproduction could be obtained by such prior art devices where the carrier was stopped during the machining operation in changing from one dimension to another or the like. In other words, operation of prior art devices where there was continuous carrier movement and continuous generation of the form of the work piece have not heretofore been satisfactory. For example, with prior art devices, it has not been possible to produce accurate shoulder control since undercutting or the like results instead of the square shoulder usually desired.

Prior art machines commonly employed a template, which template was designed to account for or correct the inaccuracies of the automatic contouring machine. It will be appreciated that this is not desirable since it requires the cost of producing a template which often is a trial and error proposition in order to determine what inaccuracies are likely to be encountered in an automatic contouring machine. It would be desirable to provide a contouring machine which will permit using a finished piece as the template if desired and which will cut square corners so as to give accurate shoulder control where desired as well as accurate size control under all conditions. In prior art hydraulically controlled devices, automatic size and shoulder control required a mechanical connection between the tool slide and tracer finger or pilot valve which is unsatisfactory since it interferes with free use of the machine tool. It would be desirable to provide an automatic precision contouring machine providing accurate size and shoulder control without any mechanical connection between the tool slide and other parts of the mechanism such as the pilot valve or tracer finger.

A problem which has been encountered in prior art devices is the production of surges in the hydraulic system. These hydraulic surges tend to cause inaccuracies in the operation and it would be desirable to provide apparatus in which any errors with respect to hydraulic surges are minimized. It would further more be desirable to provide an arrangement in which the contouring control may be attached to conventional cutting equipment or may be embodied in new machines.

Accordingly, it is an object of the present invention to provide a new and improved automatic contouring control.

It is another object to provide in an automatic precision contouring device an arrangement for minimizing the effect of hydraulic surges on the tool slide.

It is a further object of the present invention to provide a device for precision contouring which may be built as a component part of apparatus available on the market or as an attachment to existing apparatus.

It is another object of the present invention to provide a new and improved automatic contouring machine with provision for the continuous generation of form regardless of the contour.

It is a further object of the present invention to provide an automatic hydraulic contouring control device including as a part thereof a shoulder control unit.

It is an object of the present invention to provide an improved precision contouring control device with complete flexibility with respect to cutting shoulders, lengths and sizes.

A still further object of the present invention resides in an automatic precision contouring device of the hydraulic type in which the tool slide is connected to the rest of the control apparatus solely by hydraulic connections and without any mechanical connections.

Further objects and advantages of the present invention will become apparent as the following description proceeds and the features of novelty which characterize this invention will be pointed out with particularity in the claims annexed to and forming a part of this specification.

For a better understanding of the present invention reference may be had to the accompanying drawings in which:

Fig. 2 is a sectional view through a power control unit employed in the precision contouring device of the present invention with the automatic size and shoulder control unit cut away but portions of it being shown in dotted lines in the position of Fig. 1;

Fig. 3 is a sectional view taken on lines 3—3 of Figs. 1 and 2, and assuming that Fig. 2 shows the complete structure;

Fig. 4 is a back view of the size and shoulder adjusting unit shown in Fig. 1, and looking in the direction of the arrows 4—4 of Fig. 3;

Briefly, the present invention is concerned with an arrangement in which a tracer finger engaging with a finished workpiece or model of a finished workpiece controls the operation of a pilot valve, which in turn controls the operation of the interposed power control unit of the present invention. Associated with the power control unit, and mechanically connected to the pilot valve is a size and shoulder adjusting unit which permits accurate control of the tool slide in a manner not heretofore possible with prior art arrangements. The size and shoulder adjusting unit includes a member mounted for movement in the same angular direction as the tool slide, which preferably is supported at an angle of, say 60 degrees with respect to the axis of the work piece. The power control unit and the tool slide control unit are hydraulically interconnected in a closed and locked hydraulic system whereby accurate positioning and holding of the tool slide will occur under all conditions. The power control unit is designed to reduce the surge problem in the hydraulic system to a minimum.

Figure 1:
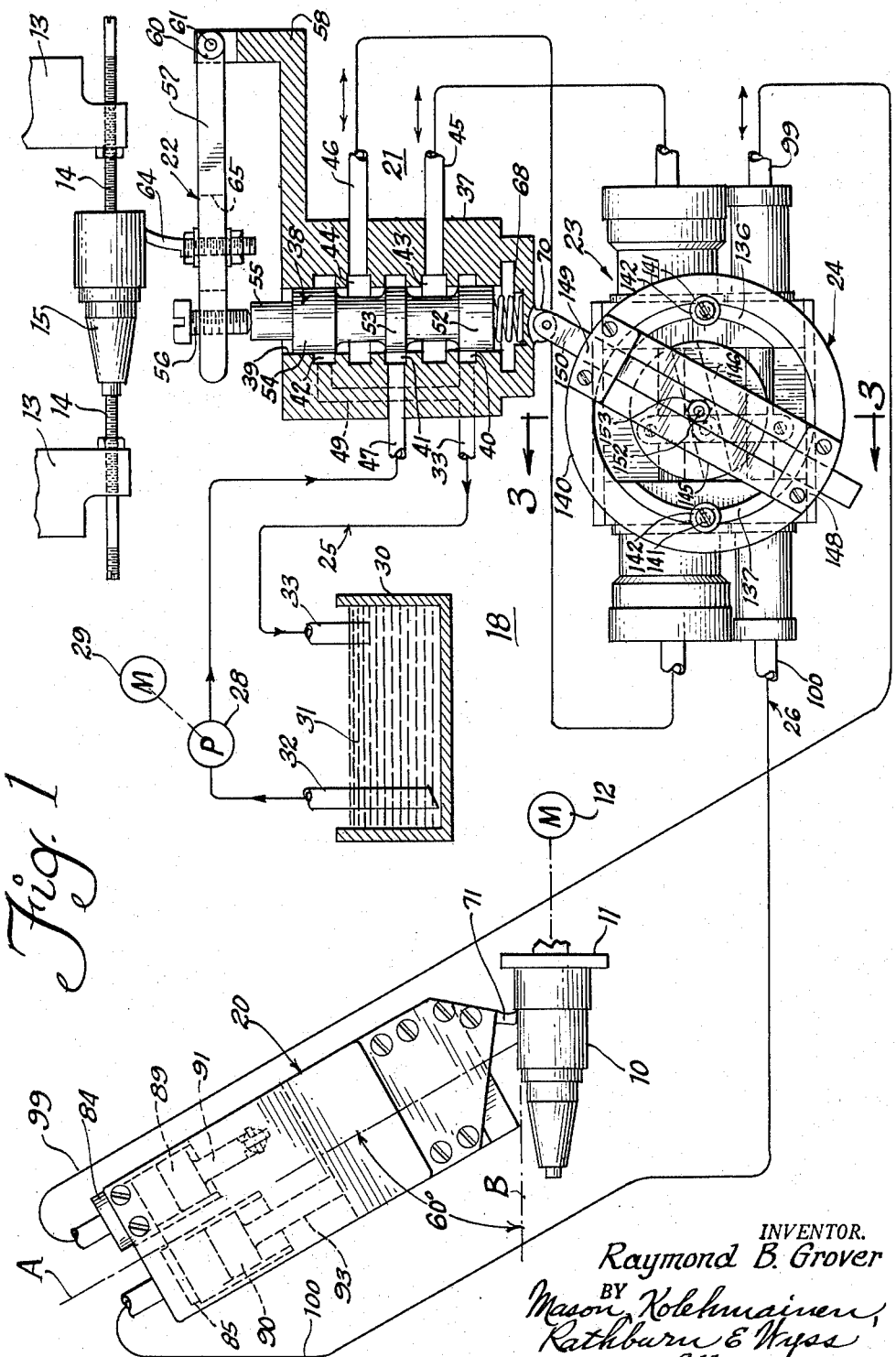
Fig. 1 is a somewhat schematic diagram of a hydraulic precision contouring device embodying the present invention.
Figure 5:
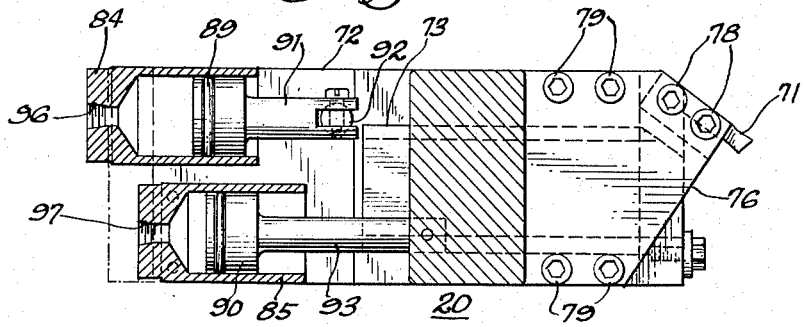
Fig. 5 is a sectional view of the tool slide control unit shown in Fig. 1 taken substantially on line 5—5 of Fig. 6.
Figure 6:
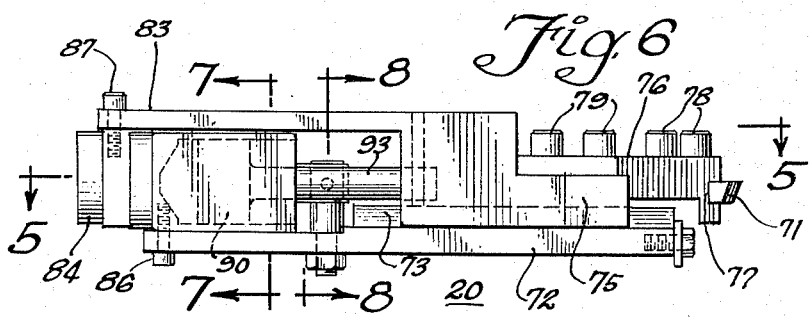
Fig. 6 is a side view of the tool slide control unit shown in Fig. 5, assuming that Fig. 5 shows the complete structure.
Figure 7:
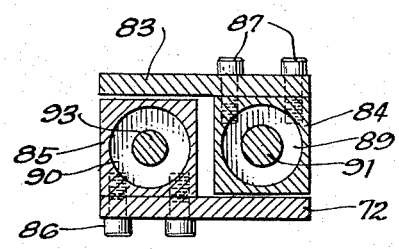
Fig. 7 is a sectional view taken on line 7—7 of Fig. 6.
Figure 8:
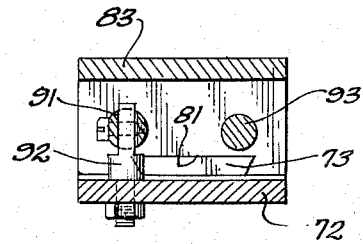
Fig. 8 is a sectional view taken on line 8—8 of Fig. 6.

Referring now to the drawings, it should be noted first of all that the improved contouring control device of the present invention may be made as an attachment for an existing tool, or it may be built as a component part of a machine. The actual manner of attachment or the construction of the machine with which it is associated is not important as far as the present invention is concerned except that in all applications of the present invention the entire mechanism is preferably carried by and movable with the part of the machine tool movable relative to the workpiece. In other words, the work must move relative to the tool slide, and, similarly, the tracer finger must move relative to a template, finished workpiece, or a model of the finished workpiece. Preferably, therefore, the tool slide, the power control unit including the size and shoulder adjusting unit, which last mentioned unit permits separate size and shoulder adjustments, and the pilot valve with associated tracer finger are mounted for longitudinal movement, assuming that the workpiece upon which cutting is accomplished is, except for rotational movement, stationary, and assuming that the model or template is also stationary. For the purpose of simplifying the disclosure, the machine tool with which the present invention is associated is not disclosed in the drawings except insofar as a workpiece 10 is specifically disclosed in Fig. 1 as drivingly connected to a chuck, driving dog or similar device 11. A suitable driving motor 12 for rotating the workpiece 10 is provided. For the purpose of describing the present invention, an application to a precision contouring tool such as the lathe or similar apparatus will be considered. However, the broad principles of the present invention may be applicable to other machine tools such as planers, shapers and the like. The only other part of the machine tool schematically disclosed in Fig. 1 comprises the means for supporting the model or template, and this is illustrated as comprising suitable supports 13 which may be connected to the machine tool in any desired manner. Preferably the supports 13 include adjustable mounting means 14 whereby the position of a template, finished workpiece or the like may be controlled. As illustrated, a finished workpiece 15 is indicated as being supported by mounting means 14. An examination of the finished workpiece 15 indicates that it includes a number of square shoulders, tapers and the like, which it is desired to exactly duplicate on the workpiece 10. As illustrated in Fig. 1, a cutting operation is being performed on the workpiece 10 in order to duplicate the finished or master workpiece 15 and the workpiece 10 is disclosed in a state of partial completion.

For the purpose of providing an automatic hydraulic precision contouring control device generally indicated by the reference numeral 18 in Fig. 1, there is provided in accordance with the present invention a tool slide control unit generally indicated by the reference numeral 20, a pilot valve generally designated by the reference numeral 21, with which pilot valve there is associated a tracer finger assembly generally designated by the reference numeral 22, a power control unit generally designated by the reference numeral 23 with which is associated a size and shoulder adjusting unit generally designated by the reference numeral 24, and a pair of independent hydraulic circuits, one designated by the reference numeral 25 and the other by the reference numeral 26. The size and shoulder controlling unit comprising a separate device for adjusting size and a separate shoulder adjusting device both described hereinafter. The hydraulic circuit indicated by the reference numeral 26, which may be designated as the locked or closed hydraulic circuit, interrelates hydraulically the tool slide control unit 20 and one portion of the power control unit 23. The hydraulic circuit 25, on the other hand, which may be designated as the live hydraulic circuit, interrelates another portion of the power control unit 23 and the pilot valve 21 and further includes a suitable hydraulic pump designated by the reference numeral 28, which may be a vane pump or any other suitable type of pump driven by a suitable power means such as an electric motor 29. In an embodiment constructed in accordance with the present invention, a vane-type pump was used for the pump 28 which was driven by a one-quarter horsepower electric motor made as a unit with the pump. It will be understood that a suitable safety or release valve is preferably included in such a unit which may be set to operate at a suitable pressure such as 85 pounds per square inch or the like. Also associated with the live hydraulic circuit 25 is a conventional gravity tank or hydraulic tank 30 containing a suitable supply of hydraulic fluid 31. The intake for the pump 28 is connected by a suitable conduit 32 with the gravity tank 31. A conduit 33 included in the hydraulic circuit 25 permits the return of hydraulic fluid from the power control unit 23 through the pilot valve 21 to the gravity tank 30.

For the purpose of hydraulically controlling the power control unit 23 in response to operation of the tracer finger unit 22, a balanced pressure type of pilot valve 21 is included. This valve 21 may be of a conventional type pilot valve somewhat schematically and somewhat structurally illustrated in Fig. 1 of the drawings. This pilot valve 21 comprises a valve housing 37 having a suitable valve bore 39 within which is reciprocally movable a suitable valve member 38. Defined along the cylindrical bore 39 and connected therewith are a plurality of annular chambers comprising a first annular exhaust chamber 40, an annular inlet chamber 41, a second annular exhaust chamber 42 and a pair of annular control chambers 43 and 44, each connected to a different portion of the power control unit 23 by conduits 45 and 46 respectively. The annular inlet chamber 41 is connected by a suitable conduit 47 with the outlet of the pump 28. The annular exhaust chambers 40 and 42 are connected together by a suitable passageway 49 defined in housing 37 and furthermore connected to conduit 33, thus completing the live hydraulic circuit 25 insofar as the connections between the pilot valve 21, the pump 28, and the gravity tank 30 are concerned.

For the purpose of selectively controlling the flow of hydraulic fluid between predetermined groups of said annular chambers 40, 41, 42, 43 and 44 defined in the valve body 37, the valve member 38 includes a plurality of enlargements 52, 53, and 54 which closely fit the bore of the cylinder 39. The enlargement 52 is effectively a valve for controlling the flow of fluid between annular chambers 40 and 43. Similarly, the enlargement 54 is effectively a valve for controlling the flow of fluid between annular chambers 42 and 44. Moreover, the enlargement 53 is effectively a valve for selectively controlling the flow of fluid between annular chambers 41 and 43 or 41 and 44, respectively. From an examination of Fig. 1, it will be apparent that if the valve member 38 is somehow moved in an upward direction relative to housing 37, the fluid under pressure can flow from conduit 47 into conduit 45, thus causing a predetermined operation of the power control unit 23. At the same time, fluid may return from power control unit 23 to conduit 46, annular chambers 44 and 42, through exhaust passageway 49 and back to the gravity tank 30 through conduit 33. In the event that the valve member 38 should move in a downward direction relative to the valve body 37 from the position shown in Fig. 1, the opposite would occur with respect to the flow of fluid to power control unit 23.

To permit the pilot valve 21 to be controlled in response to the operation of the tracer finger unit 22, the valve member 38 is provided with an extension 55, engageable with a suitable adjustable stop member 56 on the tracer finger control unit 22, which latter includes a pivotally mounted arm or lever 57 pivotally mounted to an extension 58 of the pilot valve housing 37. In order to assure accurate movement of the stop 56, the lever 57 preferably has a pair of trunnions 60 of substantial length at its pivoted end which are engaged by suitable conical bearings, not shown, mounted in the extension 58 for engagement with conical recesses 61 in the trunnions 60. A tracer finger 64 is mounted on the lever 57 and preferably may be adjustably disposed in the lever 57 by virtue of a suitable slot 65 in lever 57 permitting longitudinal adjustment of the tracer finger 64. The tracer finger 64 is also adjustable in a direction toward and away from the master 15. Thus, by virtue of the slot 65, it is possible to maintain the same sensitivity of the tracer finger pilot valve operation for various positions of tracer finger 64.

For the purpose of maintaining the extension 55 of the valve member 38 in contact with the stop 56, and effectively maintaining the tracer finger 64 in contact with the finished workpiece or template, there is provided a return spring 68 disposed beneath the lower end of valve member 38 and the lower housing wall of housing 37. This spring tends to maintain a small force of between seven and eleven ounces on the master 15 through the tracer finger 64. The operation of the pilot valve will readily be understood by those skilled in the art. Moreover, only a very small pressure need be applied to the tracer finger in order to cause movement of the valve member 38. Preferably a force of the order of eleven ounces is sufficient to cause downward movement of valve member 38 in bore 39 as viewed in Fig. 1 of the drawings. Any force in excess of eleven ounces on tracer finger 64 will cause downward movement of the valve member 38 and a pressure of less than seven ounces on tracer finger 64 will result in upward movement of the valve member 38 under the influence of return spring 68. The valve body 37 is provided with an extension 70 at its lower end for connection with the shoulder adjusting portion of the size and shoulder adjusting unit 24 to be described in greater detail hereinafter.

Before considering the power control unit 23 or the size and shoulder adjusting unit 24, attention is directed to the tool slide control unit 20 which has associated therewith a suitable cutting tool 71 which should move in a controlled manner in response to movement of the tracer finger 64 described above. Referring now to Figs. 1, 5, 6, 7 and 8, the tool slide control unit 20 comprises a suitable support 72 which may be bolted or otherwise secured to the tool carriage of the machine tool with which the present invention is employed. The tool slide support 72 is a longitudinally extending member whose longitudinal axis A is preferably mounted at a predetermined angle such as an angle of 60 degrees as shown in Fig. 1 with the rotating axis of the workpiece 10. Moreover, the support 72 includes a projection, guide member or way 73 extending along the axis A to guide the reciprocal movement of a tool slide 75. The movable tool slide 75 is adapted to support a tool holder 76 having a suitable recess 77 for receiving the tool 71. Suitable clamping means 78 are provided to hold the tool 71 in the recess 77 and suitable fastening means 79 are provided to fasten the tool holder to the tool slide 75. The tool slide 75 is provided with a cooperating groove 81 to receive the way or guide 73. With this arrangement movement of the tool slide 75 along the longitudinal axis A of the support 72 can be obtained in an accurate manner.

In order that movement of the tool 71 can be controlled in an accurate manner, the slide 75 is provided with an extension 83, to which is suitably attached as by fastening means 87 a cylinder 84. A similar cylinder 85 is attached to the support 72 as by fastening means 86. Disposed within the cylinders 84 and 85 are pistons 89 and 90, respectively. The piston 89 is connected by a connecting rod 91 and a fastening means 92 with the support 72. Similarly, the piston 90 is connected by a connecting rod 93 with the movable tool slide 75. The cylinder 84 is provided with a suitable threaded opening 96 for receiving a hydraulic connection to supply hydraulic fluid under pressure thereto. Similarly, the cylinder 85 is provided with an opening 97 for supplying hydraulic fluid under pressure thereto. It will be apparent that if fluid under pressure is supplied to cylinder 84 without similarly applying fluid under pressure to cylinder 85, that the tool 71 will move away from the workpiece 10 along the axis A. Similarly, if fluid under pressure is supplied to cylinder 85 without applying fluid under pressure to cylinder 84, the tool slide 75 will move so that the tool 71 moves toward the workpiece 10, again along the axis A which may be 60 degrees with respect to the longitudinal axis of the workpiece 10. It will, furthermore, be apparent that if fluid under pressure is supplied simultaneously to cylinders 84 and 85, each of which contains pistons of the same diameter, the tool 71 will be locked in a predetermined position. Preferably, the fluid under pressure is maintained at a pressure of between 200 pounds and 350 pounds per square inch. In a particular embodiment constructed in accordance with the present invention, the cylinders 84 and 85 each had a diameter of 1.303 inches. This dimension is by way of example only.

For the purpose of relating the tool slide control unit 20 with the power control unit 23, there is provided the hydraulic circuit 26 already mentioned which includes a conduit 99 connected to the opening 96 in the cylinder 84 and a conduit 100 connected to the opening 97 in the cylinder 85. These conduits are preferably hydraulic hoses with suitable fittings for connecting the same to associated apparatus.

In order to control the tool slide control unit 20 in accordance with the position of the tracer finger 64, and more particularly for holding the tool or cutter 71 in a fixed position for performing a suitable machining operation, there is provided the power control unit 23, best shown in Figs. 1, 2 and 3. This power control unit includes a suitable support 103 which may be bolted or otherwise secured to the portion of the machine tool also supporting the housing 37 of the pilot valve 21. Attached to the support 103 is a housing 104, specifically illustrated as a rectangular housing, but obviously it may have any size or configuration. Supported from and opening into the housing 104 in diametrically opposed relationship are a pair of cylinders 105 and 106 which form a part of the live hydraulic circuit 25 mentioned above. Also opening into the chamber defined by the housing 104 and disposed in spaced parallel relationship with the cylinders 105 and 106 are cylinders 107 and 108. The cylinders 107 and 108 are included in the locked hydraulic circuit 26, as will become apparent from the following description. Each of the cylinders 105, 106, 107 and 108 has associated therewith a suitable piston, a piston 110 being disposed in cylinder 105, a piston 111 being disposed in cylinder 106, a piston 112 being disposed in cylinder 107, and a piston 113 being disposed in cylinder 108. In order to reduce the problem of hydraulic surges and to give the desired force amplification, the cylinders 105 and 106 are preferably substantially larger in diameter than are the cylinders 107 and 108. For a particular embodiment constructed in accordance with the present invention referred to above in which the diameter of cylinders 84 and 85 were 1.303 inches, the cylinders 105 and 106 had a two-inch diameter, and the cylinders 107 and 108 had a diameter of 0.863 inch.

As is clearly indicated in Fig. 2 of the drawings, the cylinders 105 and 106 are aligned with their adjacent ends communicating through housing 104. Similarly, cylinders 107 and 108 are aligned with their adjacent ends communicating through housing 104. A piston rod 115 interconnects pistons 110 and 111, and, similarly, a piston rod or connecting rod 116 interconnects pistons 112 and 113.

To insure simultaneous movement of all the pistons 110, 111, 112 and 113, the connecting rods 115 and 116 are connected together by suitable clamping means designated as 117, best shown in Fig. 3 of the drawings. Thus, if piston 110 is moved in cylinder 105, identical motion of pistons 111, 112 and 113 will occur. The amount of fluid necessary to displace the piston 110 a predetermined distance will be substantially greater than the amount of fluid displaced in the cylinders 107 and 108 by virtue of their movement occasioned by movement of piston 110. The remote ends of the cylinders 105 and 106 are closed by suitable closures 130 and 131 which are provided with suitable openings 120 and 121, respectively, connected through the conduits 46 and 45, respectively, with the pilot valve 21. Similarly, the remote ends of cylinders 107 and 108 are provided with closure members 132 and 133 provided with openings 122 and 123, respectively, which are connected to conduits 100 and 99, respectively, of the hydraulic circuit 26. When fluid under pressure is supplied to cylinder 105, the pilot valve 21 will automatically permit fluid under pressure to flow from cylinder 106 back to gravity tank 30. From the above description it will be apparent that the hydraulic circuit 26 is completely independent of the hydraulic circuit 25 and the pilot valve 21. By virtue of the hydraulic circuit 26, there is provided a locked system for the tool slide control unit 20, and it is important that no leakage of hydraulic fluid occurs.

Although the power control unit 23 is illustrated in Fig. 2 of the drawings as having the housing 104 and the cylinders 105, 106, 107 and 108 as separate parts assembled together into a unitary structure, it will be understood that the entire power control unit may comprise a casting defining the housing 104 and the cylinders as a unitary structure.

The size and shoulder adjusting unit of the present invention, generally designated by the reference numeral 24, includes a separate shoulder adjusting portion and a separate size adjusting portion. Moreover, it is adapted to be mounted on one face of the housing 104, the other face of which is at least partially closed by a wall member 135, which wall member 135 acts as a guard to prevent one from coming in contact with the moving parts of the hydraulic control unit 23.

In order to accommodate the size and shoulder adjusting unit 24, the other side of the housing 104 opposite the wall 135 is provided with a pair of raised arcuate flanges 136 and 137 which are opposed segments of the same circular flange, the other portions thereof being cut away by virtue of the opening extending into housing 104 opposite wall 135. The circular segmental flanges 136 and 137 provide a guide for the shoulder adjusting unit which includes a portion 140 in the form of a ring or supporting annulus which may be rotated into any angular position relative to the circular segmental flanges 136 and 137.

For the purpose of fastening the annulus 140 in any desired position relative to the segmental flanges 136 and 137, suitable clamping means in the form of screws 141 and washers 142 are provided. The screws 141 are engaged in cooperating threaded openings defined in the segmental flanges 136 and 137 integral with the housing 104. The washers 142 extend over the annulus 140, and when the screws 141 are tightened clamp the same in any desired angular position.

The shoulder controlling unit in addition to annulus 140 includes a reciprocating member 150 and guide means therefor. For the purpose of providing these guide means for member 150, there are attached to the annulus 140 a pair of spaced cross members 145 and 146 fastened thereto in any suitable manner, and preferably having the ends connected by suitable cross members 148 and 149, thereby defining between the cross members 145 and 146, and also between the end members 148 and 149 and the annulus 140, a slot or guide for the reciprocating member 150. The end of the reciprocating member 150 disposed toward the pilot valve 21 is bifurcated so as to permit pivotal connection by pivot pin 151 with the extension 70 of the pilot valve 21. In accordance with the present invention, the reciprocating member 150 is angularly disposed with respect to the longitudinal axis of the cylinders associated with the power control unit 23, and preferably bears the same angular relation thereto as does the tool slide control unit 20 with respect to the longitudinal axis of the workpiece 10. Thus, if the latter is disposed at an angle of 60 degrees, the reciprocating member 150 is similarly disposed at an angle of 60 degrees. The 60 degree relationship in both instances is shown in Fig. 1 of the drawings. Preferably suitable graduations, not shown, will be provided so the angular position of the annulus 140 is indicated at all times.

For the purpose of giving the desired size control, there is supported in an adjustable manner, as by a centrally disposed screw 152 and nut 153, on the reciprocating member 150, a size controlling member 155 indicated as a circular member 155 angularly adjustable about the axis defined by the screw 152 in the reciprocating member 150. The member 155 moves along the axis of movement of the reciprocating member 150. Furthermore, the size controlling member 155 is disposed within the housing 104. Preferably suitable graduations will be associated with size controlling member 155 so that the angular position thereof will be indicated and preferably also the magnitude of size increase or decrease will be indicated. Also, if desired, micrometer adjusting or setting screws may be provided to control accurate positioning thereof.

For the purpose of controlling the movement of the reciprocating member 150 in response to the movement of the pistons associated with the power control unit 23, there is mounted within the housing 104 and movable with the pistons associated therewith a cam or way follower 160, indicated as pivotally mounted on a stud 161 supported by clamping member 117 which unites the connecting rods 115 and 116. The cam or way follower 160 is adapted to slide in a way or guide 162 defined on the adjacent face of the size control member 155. The guide or way 162, which is preferably defined by a pair of spaced parallel flanges 163 extending from the size control member 155, is disposed at an angle with respect to the longitudinal axis of the connecting rods 115 and 116, which angle is adjustable by virtue of the centrally disposed screw 152 and nut 153 to give the desired size control. If the guide or way 162 were parallel with connecting rods 115 and 116, then, obviously, movement of the connecting rods would occasion no movement of the reciprocating member 150. However, it is desired that movement of the connecting rods 115 and 116 in a predetermined direction will tend to restore the pilot valve 21 to a condition to terminate such movement. Hence, the angular position of the guide or way 162 is adjusted so that reciprocating movement of the connecting rods 115 and 116 will tend to cause movement of the member 150, and, hence, movement of the housing 37 of the pilot 21 to which the member 150 is connected. It will be understood that although portions of the shoulder adjusting unit have been indicated as made up of a plurality of separate parts united as an integral unit, they might equally well be made of a single casting or the like.

Considering now the operation of the device of the present invention, with reference particularly to Fig. 1 of the drawings, and assuming that the tool slide control unit 20 and the size and shoulder adjusting unit 24 are in the positions indicated in Fig. 1 of the drawings, the machining operation may be instigated in the conventional manner. Under steady state conditions, the same pressure exists on the two pistons 89 and 90 controlling the tool 71 which in effect comprise a tool slide hydraulic motor, and, hence, tool 71 is held firmly in a predetermined set position. The pump 28 will maintain a predetermined pressure in the hydraulic circuit 25, and if a pressure within the range of seven to eleven ounces is applied to the tracer finger 64, no force tending to move the valve member 38 downwardly will exist. Of course, if the pressure on the finger 34 is less than, say, seven ounces, the spring 68 will move the valve member 38 upwardly to cause the tracer finger 64 to engage the master 15. Assuming that the tracer finger reaches a portion on the master where a downward force is applied to the finger 64 exceeding a force such as eleven ounces, valve member 38 will move downwardly relative to housing 37. Such downward movement of valve member 38 will connect annular pressure or inlet chamber 41 with annular chamber 44. Simultaneously, it will connect annular exhaust chamber 40 with annular chamber 43. This means that fluid under pressure will flow from pump 28 through the pilot valve 21 through conduit 46 and to the left-hand end of the power control unit 23, as viewed in Fig. 1, into the cylinder 105, to cause movement to the right, as viewed in Fig. 2 of the drawings, of the four pistons associated with the power control unit 23. Simultaneously, the hydraulic fluid contained in cylinder 106 is forced through conduit 45 and pilot valve 21 back to gravity tank 30. Obviously, the movement of the pistons 112 and 113 to the right, as viewed in Fig. 2, will cause fluid under pressure to move from the right-hand end of power control unit 23 into the cylinder 84 of the tool slide control unit 20. Simultaneously, an equal amount of hydraulic fluid in cylinder 85 of the tool slide control unit 20 is displaced through conduit 100 and returned to the other end of the power control unit 23, and, specifically, to the cylinder 107. This action causes the tool 71 to move in a direction along the axis A and away from the workpiece 10, which is the desired direction of movement.

While the above movement of the tool 71 occurs, the movement to the right of the connecting rods 115 and 116, as viewed in Fig. 1, will cause the cam follower 160 to move along guide or way 162. Since the guide or way is disposed at an angle as viewed in Fig. 1, such movement will cause size control block or reciprocating member 150 to move in a downward direction, with the result that the valve housing 37 of pilot valve 21 moves downwardly in the same direction that valve member 38 has moved to tend to restore the balanced pressure condition. It will be readily apparent that should the pressure on tracer finger 64 decrease, the conditions would reverse, and, again, equilibrium conditions would be restored in response to movement of the pistons within the power control unit 23.

By virtue of the large differential in diameter of the pistons 110 and 111 as contrasted with 112 and 113, a much larger fluid displacement is necessary in the hydraulic circuit 25 in order to produce a much smaller fluid displacement in hydraulic circuit 26 with the same piston movement. Thus, any hydraulic surges produced in hydraulic circuit 25 which are bound to occur, will be greatly minimized when translated into hydraulic circuit 26.

The arrangement is so constructed that reciprocating member 150 will move the same extent and along the same angle as the movable portion of the tool slide control unit 20.

If an occasion arises where it is desired to do face contouring, then the size and shoulder adjusting unit is set at an angle of 90 degrees with the axis of movement of the pistons and the tool slide control unit 20 is set at an angle of 90 degrees with the face to be contoured. The size control member 155 supporting the guide or way 162 can then be adjusted for the correct size control and contour, so that the tracer finger works on the same point of contact around the object or master 15 which it is following.

From the above description it will be apparent that there has been provided a simple and compact arrangement which may readily be applied either to new machine tools or to machine tools already in existence, and which will give accurate hydraulic precision contouring.

While there has been illustrated and described what is at present believed to be a preferred embodiment of the present invention, it will be obvious to those skilled in the art that numerous changes and modifications can be made with respect thereto, and it is aimed in the appended claims to cover all such changes and modifications as fall within the true spirit and scope of the present invention.

What is claimed as new and desired to be secured by Letters Patent of the United States is:

1. In a metal working machine, apparatus for automatic precision positioning of a metal cutting tool relative to a workpiece to perform a machining operation in conformance with the contour of a pattern or model, a tool slide including a tool, means for supporting said tool slide on a portion of said machine movable relative to said workpiece, said tool being mounted for limited movement relative to said tool slide in a direction toward and away from said workpiece, a tool slide fluid motor for controlling the position of said tool relative to said tool slide, means for predetermining the path of movement of said tool comprising a pattern, a tracer finger movable over said pattern as said tool traverses the workpiece, a power control unit comprising two independent fluid motors, a first hydraulic circuit comprising one fluid motor of said power unit and a source of fluid under pressure, a balanced pressure type pilot valve in said first hydraulic circuit for controlling the operation of said one fluid motor, said pilot valve comprising a valve body and a valve member with said valve member connected to said tracer finger, a second hydraulic circuit connecting said tool slide fluid motor and the other fluid motor of said power control unit in a closed hydraulic circuit whereby operation of said other fluid motor causes a corresponding operation of said tool slide fluid motor, said first and second hydraulic circuits being separate and wholly independent, means for mechanically interconnecting said two independent fluid motors so that operation of said one causes simultaneous operation of said other, a cam follower movable in response to operation of said two fluid motors, an angularly adjustable size and shoulder controlling unit mounted on said power control unit comprising a reciprocal member connected to said valve body and a slide engageable with said cam follower to cause said valve body to move in a predetermined manner in response to operation of said two fluid motors.

2. In a machine tool of the type having an automatically hydraulically positioned tool for duplicating a workpiece in dependence upon a tracer finger traversing a master workpiece, a pair of independent hydraulic circuits each having a fluid motor associated therewith, said fluid motors comprising longitudinally movable members combined in a power control unit, means for mechanically interconnecting said fluid motors so that operation of the fluid motor in one of said hydraulic circuits causes simultaneous and similar operation of the fluid motor in the other hydraulic circuit and corresponding change in the hydraulic circuit with which it is associated, a balanced pressure type pilot valve in said one hydraulic circuit, means responsive to movement of said tracer finger in dependence upon changes in contour of said master workpiece for operating said pilot valve, an element mounted for movement with said longitudinally movable members, an angularly adjustable size and shoulder controlling unit mounted on said power control unit comprising a reciprocal member, angularly adjustable means on said reciprocal member including a slide engageable with said element whereby longitudinal movement of said element causes a predetermined movement of said reciprocable element dependent upon the angular position of said angularly adjustable means, and means interconnecting said reciprocal member with said pilot valve to control said pilot valve in a sense opposite to that of said tracer finger when operation of said fluid motors in response to movement of said tracer finger occurs.

3. In a machine tool of the type having an automatically hydraulically positioned tool for duplicating a workpiece in dependence upon a tracer finger traversing a master workpiece, a pair of independent hydraulic circuits each having a fluid motor associated therewith, said fluid motors comprising longitudinally movable members combined in a power control unit, said fluid motors having different capacities, means for mechanically interconnecting said fluid motors so that operation of the fluid motor in one of said hydraulic circuits causes simultaneous and similar operation of the fluid motor in the other hydraulic circuit and corresponding change in the hydraulic circuit with which it is associated, a balanced pressure type pilot valve comprising a valve body and valve member, means for connecting said pilot valve in said one hydraulic circuit, means responsive to movement of said tracer finger in dependence upon changes in contour of said master workpiece for moving said valve member, an element mounted for movement with said longitudinally movable members, an angularly adjustable size and shoulder controlling unit mounted on said power control unit comprising a reciprocal member, angularly adjustable means on said reciprocal member including a slide engageable with said element whereby longitudinal movement of said element causes predetermined movement of said reciprocable element dependent upon the angular position of said angularly adjustable means, and means interconnecting said reciprocal member with said valve body to control said pilot valve in a sense opposite to that of said tracer finger when operation of said fluid motors in response to movement of said tracer finger occurs.

4. The arrangement set forth in claim 2 in which said tool is positioned for movement along an axis disposed at a predetermined angle with respect to the longitudinal axis of said workpiece, and said reciprocal member is positioned at the same predetermined angle with respect to the line of movement of said longitudinally movable members.

5. In a machine tool of the type having an automatically hydraulically positioned tool for duplicating a workpiece in dependence upon a tracer finger traversing a master workpiece, a pair of independent hydraulic circuits each having a fluid motor associated therewith, said fluid motors comprising longitudinally movable members combined in a power control unit, means for mechanically interconnecting said fluid motors so that operation of the fluid motor in one of said hydraulic circuits causes simultaneous and similar operation of the fluid motor in the other hydraulic circuit and corresponding change in the hydraulic circuit with which it is associated, a balanced pressure type pilot valve in said one hydraulic circuit, means responsive to movement of said tracer finger in dependence upon changes in contour of said master workpiece for operating said pilot valve, an element mounted for movement with said longitudinally movable members, an angularly adjustable size and shoulder controlling unit mounted on said power control unit comprising a reciprocal member, angularly adjustable means on said reciprocal member including a slide engageable with said element whereby longitudinal movement of said element causes a selected predetermined movement of said reciprocable element dependent upon the angular position of said angularly adjustable means, means interconnecting said reciprocal member with said pilot valve to control said pilot valve in a sense opposite to that of said tracer finger when operation of said fluid motors in response to movement of said tracer finger occurs, and means for adjusting the angle of movement of said reciprocal member relative to the line of longitudinal movement of said element.

6. In a metal working machine, apparatus for automatic precision positioning of a metal cutting tool relative to a workpiece to perform a machining operation in conformance with the contour of a pattern or model, a tool slide including a tool, means for supporting said tool slide on a portion of said machine movable relative to said workpiece, said tool being mounted for limited movement relative to said tool slide in a direction toward and away from said workpiece, a piston type tool slide fluid motor for controlling the position of said tool, the path of movement of said tool being predetermined by a pattern, a tracer finger movable over said pattern as said tool traverses the workpiece, a power control unit comprising two independent piston type fluid motors, a first hydraulic circuit comprising one fluid motor of said power unit and a source of fluid under pressure, a balanced pressure type pilot valve in said first hydraulic circuit for controlling the operation of said one fluid motor, said pilot valve comprising a valve body and a valve member with said valve member connected to said tracer finger, a second hydraulic circuit connecting said tool slide fluid motor and the other fluid motor of said power control unit in a closed hydraulic circuit whereby operation of said other fluid motor causes a corresponding operation of said tool slide fluid motor, said first and second hydraulic circuits being separate and wholly independent, means for mechanically interconnecting the pistons of said two independent fluid motors so that operation of said one causes simultaneous operation of said other, an element longitudinally movable in response to operation of said two fluid motors, and an angularly adjustable size and shoulder controlling unit mounted on said power control unit comprising a reciprocal member connected to said valve body and an angularly adjustable slide mounted for movement with said reciprocal member and engageable with said element to cause said valve body to move in a predetermined manner in response to operation of said two fluid motors.

7. The arrangement set forth in claim 6 in which said pistons of said two fluid motors are of substantially different diameters to minimize the hydraulic surges produced in said second hydraulic circuit.

8. A hydraulic control system comprising first and second hydraulic control motors, an output hydraulic motor, a pilot valve, first and second independent fluid circuits, said first circuit including said pilot valve and said first motor, said second circuit including said output motor and said second motor, mechanical means interconnecting said first and second motors so that said control motors operate in unison, a mechanical connection between said control motors and said pilot valve for operatively positioning said valve in accord with the positions of said control motors, and means for continuously operating said pilot valve in response to a continuous input signal supplied thereto.

9. The system of claim 8 wherein said mechanical connection is adjustable whereby the degree of movement of said valve in response to movement of said control motors is controllable.

References Cited in the file of this patent

UNITED STATES PATENTS

| 278,018 | Hudson | May 22, 1883 |
| 1,552,584 | Sumner | Sept. 8, 1925 |
| 1,950,332 | Von Pechmann | Mar. 6, 1934 |
| 2,313,849 | Turchan | Mar. 16, 1943 |
| 2,360,578 | Porter | Oct. 17, 1944 |
| 2,365,471 | Ingres | Dec. 19, 1944 |
| 2,372,427 | Johnson | Mar. 27, 1945 |
| 2,380,357 | Ziebolz | July 10, 1945 |
| 2,464,626 | Waterson | Mar. 15, 1949 |
| 2,474,134 | Waterson | June 21, 1949 |
| 2,526,956 | Kugler | Oct. 24, 1950 |
| 2,559,138 | Waterson | July 3, 1951 |
| 2,587,542 | Siekmann | Feb. 26, 1952 |
| 2,601,345 | Turchan | June 24, 1952 |
| 2,607,321 | Lado | Aug. 19, 1952 |
| 2,706,892 | Fritschi | Apr. 26, 1955 |
| 2,743,584 | Rosebrook | May 1, 1956 |